(12) United States Patent
Su et al.

(10) Patent No.: US 11,287,844 B2
(45) Date of Patent: Mar. 29, 2022

(54) SUPPORT BASE AND DISPLAY DEVICE

(71) Applicant: QISDA CORPORATION, Taoyuan (TW)

(72) Inventors: Yung-Chun Su, New Taipei (TW); Hui-Chieh Hu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 187 days.

(21) Appl. No.: 16/835,225

(22) Filed: Mar. 30, 2020

(65) Prior Publication Data

US 2021/0208623 A1 Jul. 8, 2021

(30) Foreign Application Priority Data

Jan. 2, 2020 (TW) ................................ 10910004.4

(51) Int. Cl.
*H05K 1/16* (2006.01)
*G06F 1/16* (2006.01)
*F16M 11/20* (2006.01)
*H05K 5/00* (2006.01)

(52) U.S. Cl.
CPC ....... *G06F 1/1601* (2013.01); *F16M 11/2014* (2013.01); *F16M 11/2092* (2013.01); *H05K 5/0017* (2013.01)

(58) Field of Classification Search
None
See application file for complete search history.

(56) References Cited

U.S. PATENT DOCUMENTS

| | | | | |
|---|---|---|---|---|
| 5,494,447 A | * | 2/1996 | Zaidan | G06F 1/1618 16/361 |
| 5,847,685 A | * | 12/1998 | Otsuki | B60K 35/00 345/87 |
| 6,163,451 A | * | 12/2000 | Chiu | F16M 11/10 248/419 |
| 6,288,891 B1 | * | 9/2001 | Hasegawa | F16M 11/10 248/923 |
| 6,912,121 B2 | * | 6/2005 | Karidis | G06F 1/1616 248/455 |
| 7,107,084 B2 | * | 9/2006 | Duarte | G06F 1/1616 379/433.12 |
| 8,250,711 B1 | * | 8/2012 | Chen | E05D 15/58 16/354 |

(Continued)

FOREIGN PATENT DOCUMENTS

| | | |
|---|---|---|
| CN | 107191754 A | 9/2017 |
| CN | 206669257 U | 11/2017 |
| CN | 209725689 U | 12/2019 |

*Primary Examiner* — Xanthia C Cunningham

(57) ABSTRACT

A support base includes a base casing, a support frame, a first rack, an auxiliary support member and at least one gear. The support frame is movably disposed on the base casing. The first rack is disposed in the base casing and connected to the support frame. The auxiliary support member is movably disposed in the base casing. The auxiliary support member has a second rack. The at least one gear meshes with the first rack and the second rack. When the support frame moves linearly along a first direction, the first rack drives the auxiliary support member to move along a second direction through the at least one gear and the second rack, wherein an angle included between the first direction and the second direction is essentially between 0 degrees and 90 degrees.

20 Claims, 19 Drawing Sheets

(56) References Cited

U.S. PATENT DOCUMENTS

| | | | | |
|---|---|---|---|---|
| 8,259,437 B2* | 9/2012 | Vesely | .................. | G06F 1/1616 |
| | | | | 361/679.01 |
| 8,272,104 B2* | 9/2012 | Chen | ..................... | G06F 1/1616 |
| | | | | 16/354 |
| 8,672,277 B2* | 3/2014 | Hsu | ........................ | F16M 11/10 |
| | | | | 248/121 |
| 9,348,363 B2* | 5/2016 | Hui | ........................ | G06F 1/1624 |
| 9,846,451 B2* | 12/2017 | Koo | ..................... | G06F 1/1654 |
| 10,126,776 B1* | 11/2018 | Nguyen | ............. | F16M 11/2092 |
| 10,697,505 B2* | 6/2020 | Tan | ........................ | F16D 55/16 |
| 2006/0175476 A1* | 8/2006 | Hasegawa | .............. | F16M 11/28 |
| | | | | 248/125.1 |
| 2007/0058329 A1* | 3/2007 | Ledbetter | ........... | F16M 11/2021 |
| | | | | 361/679.06 |
| 2008/0149800 A1* | 6/2008 | Katsumata | ............. | F16M 11/38 |
| | | | | 248/349.1 |
| 2009/0040701 A1* | 2/2009 | Lin | ........................ | G06F 1/1681 |
| | | | | 361/679.27 |
| 2012/0194988 A1* | 8/2012 | Pan | ........................ | F16M 11/18 |
| | | | | 361/679.26 |
| 2015/0192966 A1* | 7/2015 | Kim | ...................... | G06F 1/1681 |
| | | | | 361/679.28 |

* cited by examiner

SUPPORT BASE AND DISPLAY DEVICE

BACKGROUND OF THE INVENTION

1. Field of the Invention

The invention relates to a support base and a display device and, more particularly, to a support base capable of keeping stability of the center of gravity while a support frame is moving linearly with respect to a base casing and a display device equipped with the support base.

2. Description of the Prior Art

In general, a display device is equipped with a support base, such that the display device can be placed on a plane by the support base. At present, some support bases allow a user to linearly move a display unit disposed on the support base, so as to adjust a viewing distance. However, when the display unit moves linear along with the support frame, the center of gravity of the display device will change. At this time, the display device may topple over due to instability of the center of gravity.

SUMMARY OF THE INVENTION

An objective of the invention is to provide a support base capable of keeping stability of the center of gravity while a support frame is moving linearly with respect to a base casing and a display device equipped with the support base, so as to solve the aforesaid problems.

According to an embodiment of the invention, a support base comprises a base casing, a support frame, a first rack, an auxiliary support member and at least one gear. The support frame is movably disposed on the base casing. The first rack is disposed in the base casing and connected to the support frame. The auxiliary support member is movably disposed in the base casing. The auxiliary support member has a second rack. The at least one gear meshes with the first rack and the second rack. When the support frame moves linearly along a first direction, the first rack drives the auxiliary support member to move along a second direction through the at least one gear and the second rack, wherein an angle included between the first direction and the second direction is essentially between 0 degrees and 90 degrees.

According to another embodiment of the invention, a display device comprises a support base and a display unit. The support base comprises a base casing, a support frame, a first rack, an auxiliary support member and at least one gear. The support frame is movably disposed on the base casing. The first rack is disposed in the base casing and connected to the support frame. The auxiliary support member is movably disposed in the base casing. The auxiliary support member has a second rack. The at least one gear meshes with the first rack and the second rack. The display unit is disposed on the support frame. When the support frame moves linearly along a first direction, the first rack drives the auxiliary support member to move along a second direction through the at least one gear and the second rack, wherein an angle included between the first direction and the second direction is essentially between 0 degrees and 90 degrees.

As mentioned in the above, when the support frame moves linearly with respect to the base casing, the invention uses the first rack, the at least one gear and the second rack to cooperate with each other to drive the auxiliary support member to move synchronously. For example, when the support frame moves linearly forward or upward with respect to the base casing, the auxiliary support member will extend forward from the base casing. Furthermore, when the support frame moves linearly back to the original position with respect to the base casing, the auxiliary support member will retract into the base casing synchronously. Accordingly, the display device and the support frame thereof can keep stability of the center of gravity by the auxiliary support member and will not topple over during movement.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
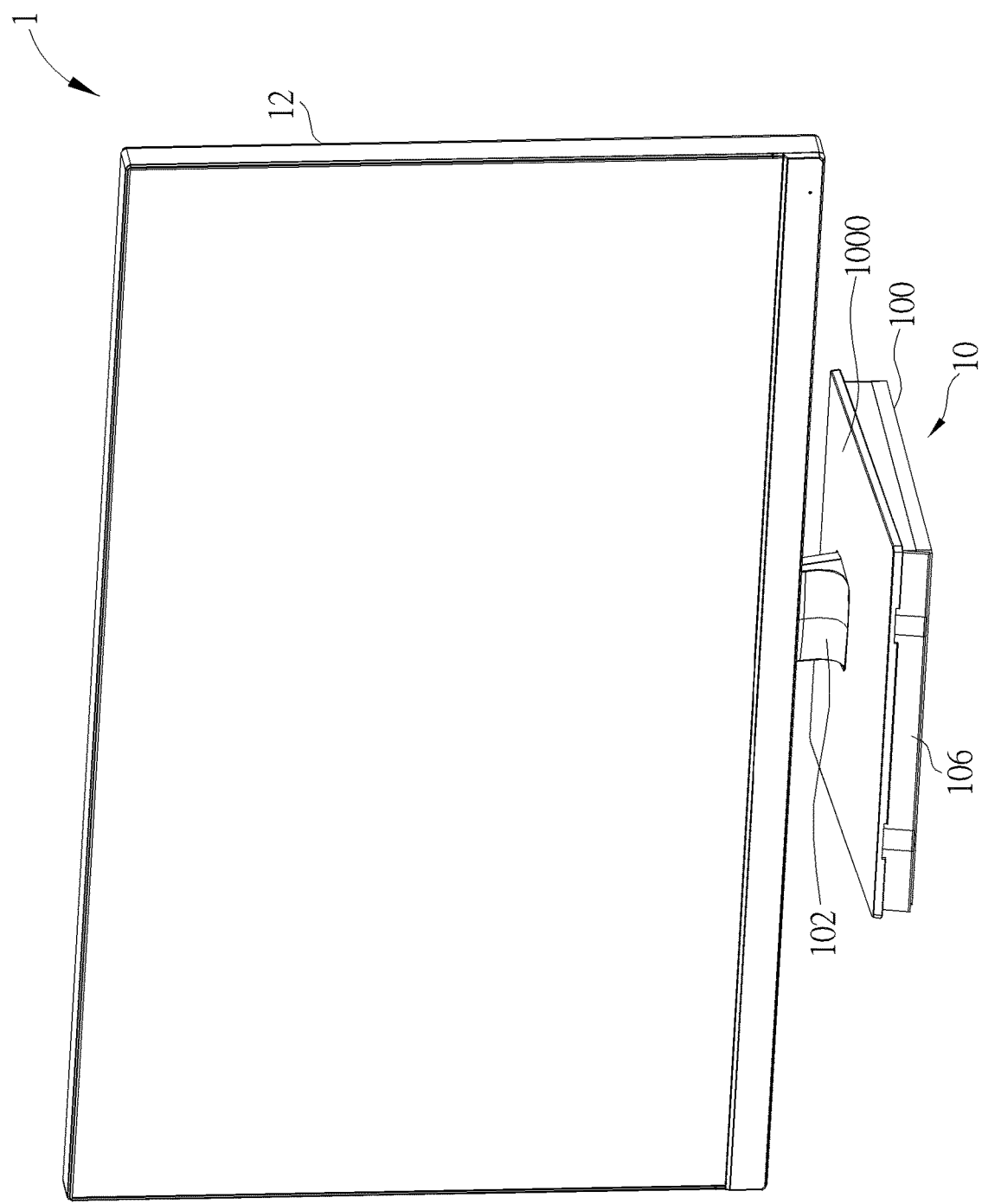
FIG. 1 is a perspective view illustrating a display device according to an embodiment of the invention.
Figure 2:
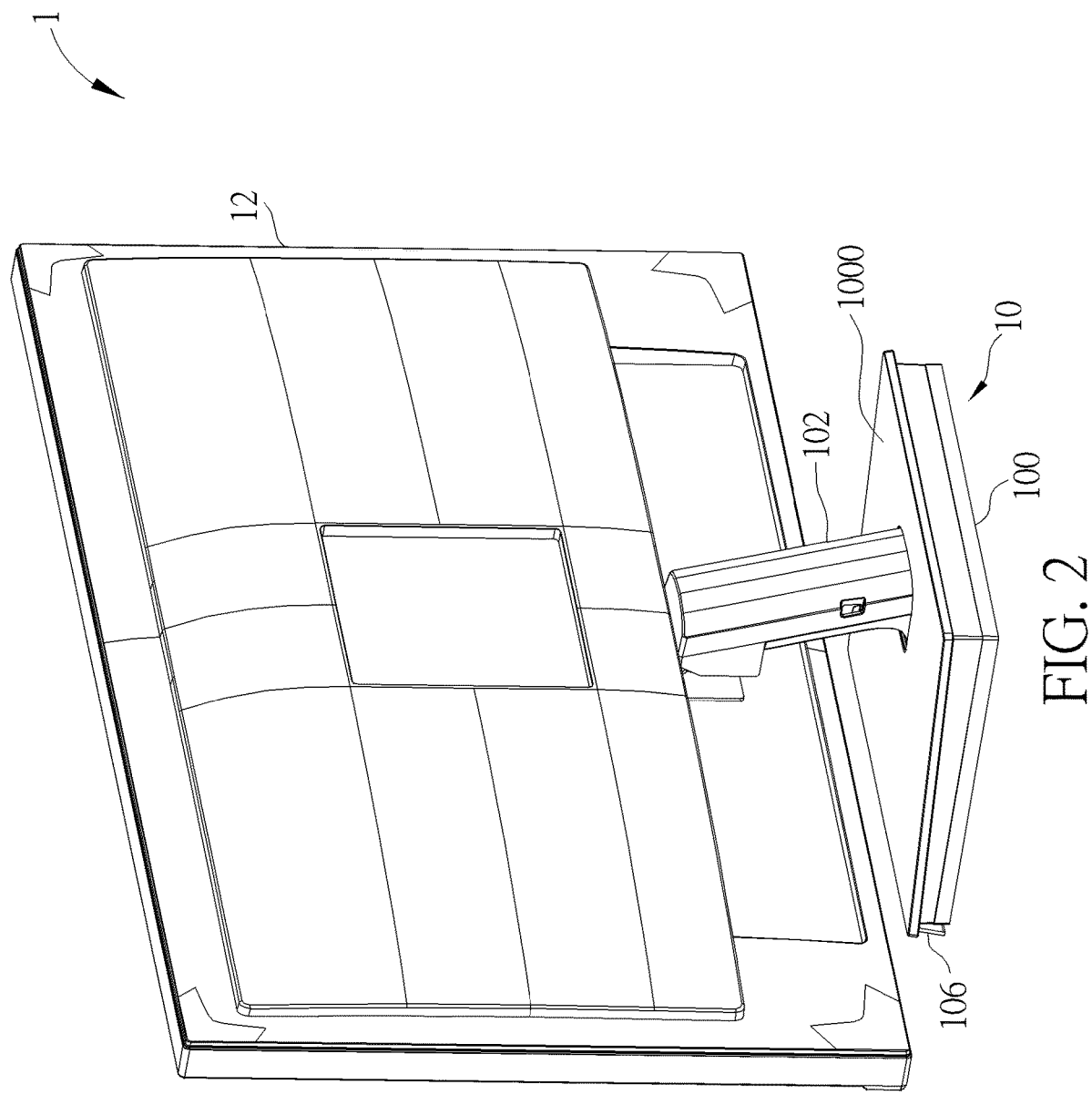
FIG. 2 is a perspective view illustrating the display device shown in FIG. 1 from another viewing angle.
Figure 3:
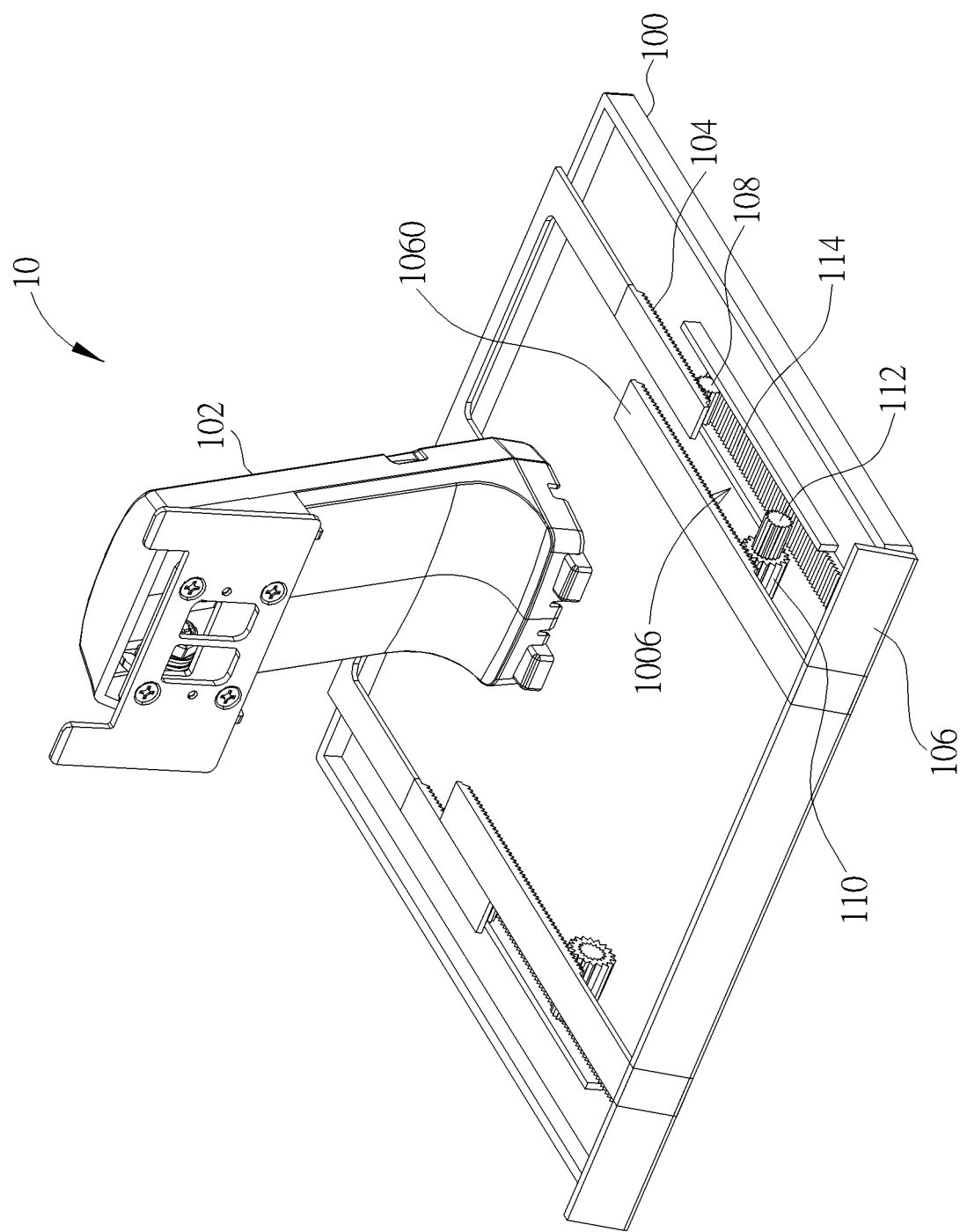
FIG. 3 is a perspective view illustrating the inside of the support base shown in FIG. 1.
Figure 4:
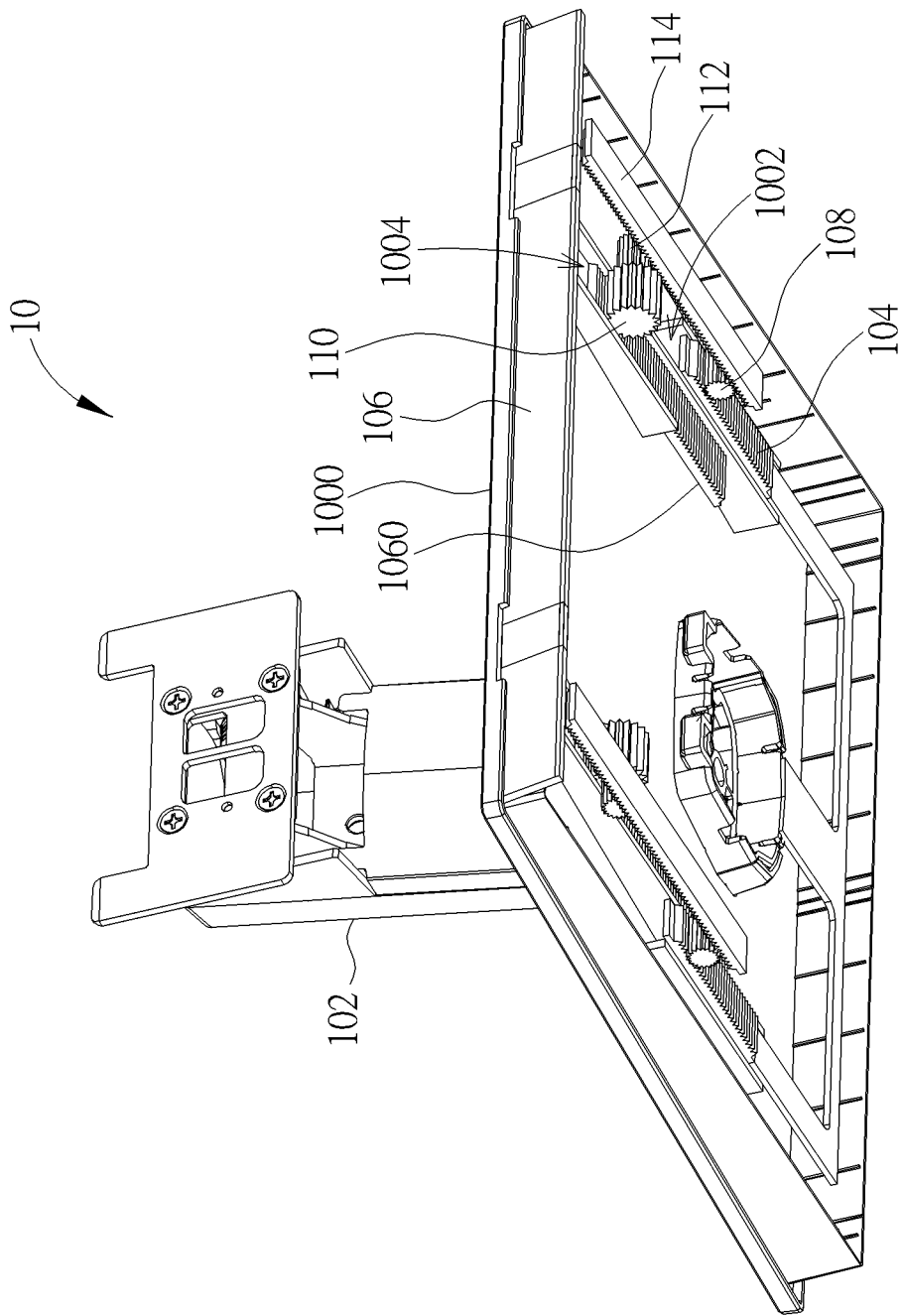
FIG. 4 is a perspective view illustrating the inside of the support base shown in FIG. 1 from another viewing angle.
Figure 5:
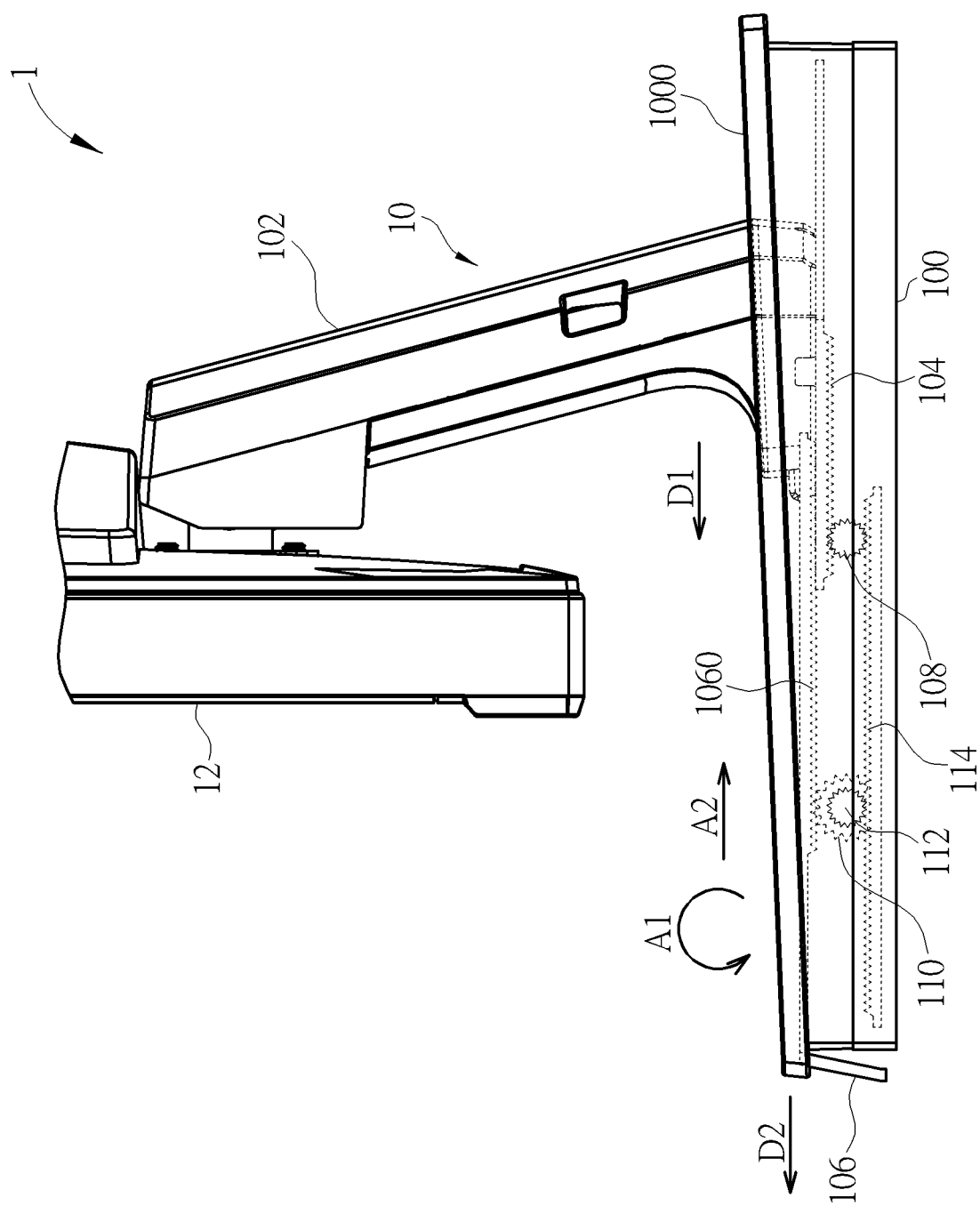
FIG. 5 is a side view illustrating the display device shown in FIG. 1.
Figure 6:
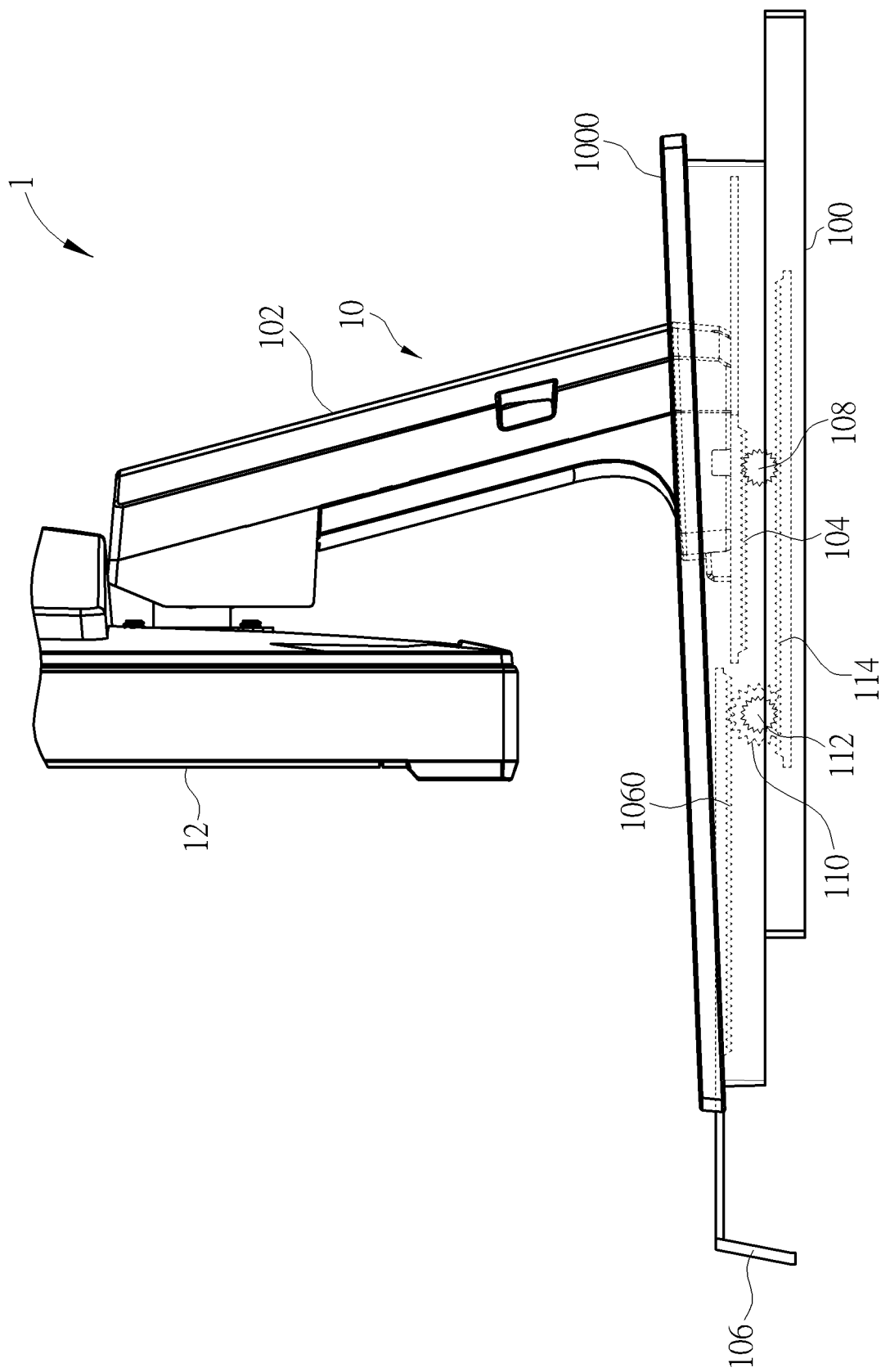
FIG. 6 is a side view illustrating the support frame shown in FIG. 5 after moving linearly with respect to the base casing.

Referring to FIGS. 1 to 6, FIG. 1 is a perspective view illustrating a display device 1 according to an embodiment of the invention, FIG. 2 is a perspective view illustrating the display device 1 shown in FIG. 1 from another viewing angle, FIG. 3 is a perspective view illustrating the inside of the support base 10 shown in FIG. 1, FIG. 4 is a perspective view illustrating the inside of the support base 10 shown in FIG. 1 from another viewing angle, FIG. 5 is a side view illustrating the display device 1 shown in FIG. 1, and FIG. 6 is a side view illustrating the support frame 102 shown in FIG. 5 after moving linearly with respect to the base casing 100.

As shown in FIGS. 1 to 4, the display device 1 comprises a support base 10 and a display unit 12. The support base 10 comprises a base casing 100, a support frame 102, a first rack 104, an auxiliary support member 106, a first gear 108, a second gear 110, a third gear 112 and a third rack 114. The display unit 12 is disposed on the support frame 102 of the support base 10. In this embodiment, the display unit 12 may be, but not limited to, a display (e.g. liquid crystal display, plasma display, organic light emitting diode display, and so on). In another embodiment, the display unit 12 may also be replaced by other objects disposed on the support frame 102 of the support base 10. In other words, the support base 10 is not limited to cooperate with the display unit 12 to form the display device 1.

The support frame 102 is movably disposed on the base casing 100. In this embodiment, the support frame 102 may move linearly along a first direction D1 from a position shown in FIG. 5 to another position shown in FIG. 6. The base casing 100 may comprise a cover 1000, wherein the cover 1000 is connected to the support frame 102. Accordingly, when the support frame 102 moves linearly along the first direction D1, the support frame 102 drives the cover 1000 to move linearly along the first direction D1.

The first rack 104 is disposed in the base casing 100 and connected to the support frame 102. In this embodiment, two first racks 104 may be connected to opposite sides of the support frame 102 and the cover 1000 may have two sliding grooves 1002 for accommodating the two first racks 104. Accordingly, when the support frame 102 moves linearly along the first direction D1, the support frame 102 drives the first racks 104 to move linearly within the sliding grooves 1002.

The auxiliary support member 106 and the third rack 114 are movably disposed in the base casing 100, wherein the auxiliary support member 106 has a second rack 1060. In this embodiment, the auxiliary support member 106 may have two second racks 1060 and the cover 1000 may have two sliding grooves 1004 for accommodating the two second racks 1060. Furthermore, the base casing 100 may have two sliding grooves 1006 for accommodating two third racks 114.

In this embodiment, the support base 10 may comprise two first gears 108, two second gears 110 and two third gears 112, wherein the second gear 110 and the third gear 112 are coaxial. The first gear 108 meshes with the first rack 104 and the third rack 114, the second gear 110 meshes with the second rack 1060, and the third gear 112 meshes with the third rack 114.

It should be noted that the support base 10 of the invention may comprise one or more sets of first rack 104, second rack 1060, third rack 114, first gear 108, second gear 110 and third gear 112 according to practical applications.

As shown in FIG. 5, when the support frame 102 moves linearly along the first direction D1, the first rack 104 drives the first gear 108 to rotate along a direction indicated by an arrow A1. Then, the first gear 108 drives the third rack 114 to move along a direction indicated by an arrow A2. Then, the third rack 114 drives the third gear 112 to rotate along the direction indicated by the arrow A1. Since the second gear 110 and the third gear 112 are coaxial, the second gear 110 rotates along with the third gear 112 along the direction indicated by the arrow A1. At this time, the second gear 110 drives the second rack 1060 to move along a second direction D2, so as to drive the auxiliary support member 106 to move along the second direction D2. In other words, when the support frame 102 moves linearly along the first direction D1, the first rack 104 drives the auxiliary support member 106 to move along the second direction D2 through the first gear 108, the third rack 114, the third gear 112, the second gear 110 and the second rack 1060, such that the auxiliary support member 106 extends forward from the base casing 100, as shown in FIG. 6. In this embodiment, an angle included between the first direction D1 and the second direction D2 may be essentially equal to 0 degrees, i.e. the first direction D1 and the second direction D2 may be identical and parallel to each other.

Accordingly, the display device 1 and the support base 10 thereof can keep stability of the center of gravity by the auxiliary support member 106 and will not topple over during movement. Needless to say, the support frame 102 may also move linearly with respect to the base casing 100 from the position shown in FIG. 6 to the position shown in FIG. 5. At this time, the auxiliary support member 106 retracts into the base casing 100 synchronously.

In this embodiment, a diameter of the first gear 108 may be equal to a diameter of the third gear 112, and a diameter of the second gear 110 may be smaller than a diameter of the third gear 112. It should be noted that the diameter of the gear mentioned in the invention is a diameter of a reference circle of the gear. Accordingly, when the support frame 102 drives the cover 1000 to move linearly along the first direction D1, the auxiliary support member 106 is capable of moving more distances than the support frame 102 and the cover 1000, such that there is a relative displacement between the auxiliary support member 106 and the cover 1000. Accordingly, the center of gravity of the display device 1 and the support base 10 thereof may be kept more stably during movement.

In another embodiment, the diameter of the second gear 110 may also be equal to the diameter of the third gear 112, such that there is no relative displacement between the auxiliary support member 106 and the cover 1000. At this time, the second gear 110 and the third gear 112 may be integrated into an identical gear.

Figure 7:
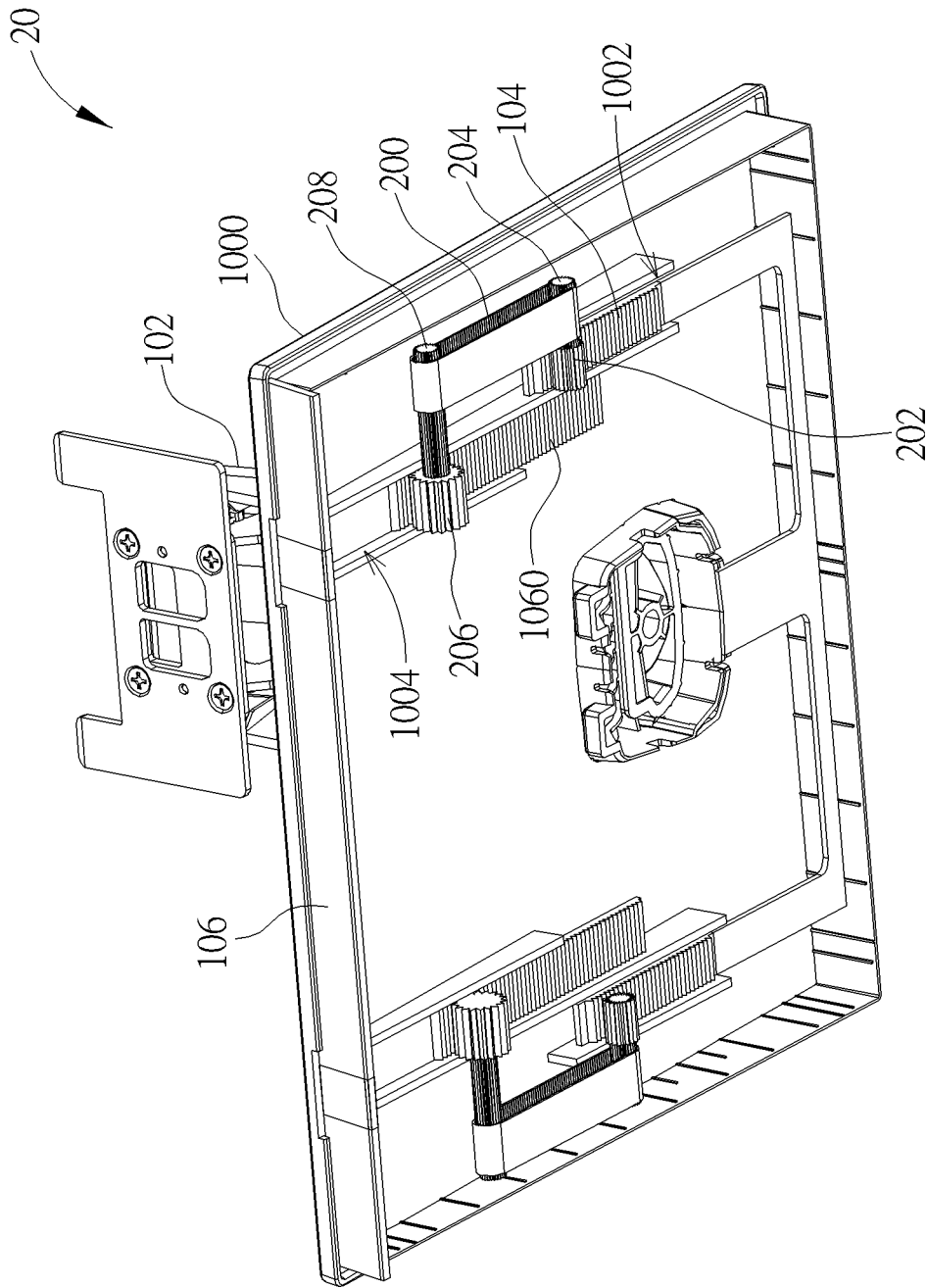
FIG. 7 is a perspective view illustrating the inside of a support base according to another embodiment of the invention.
Figure 8:
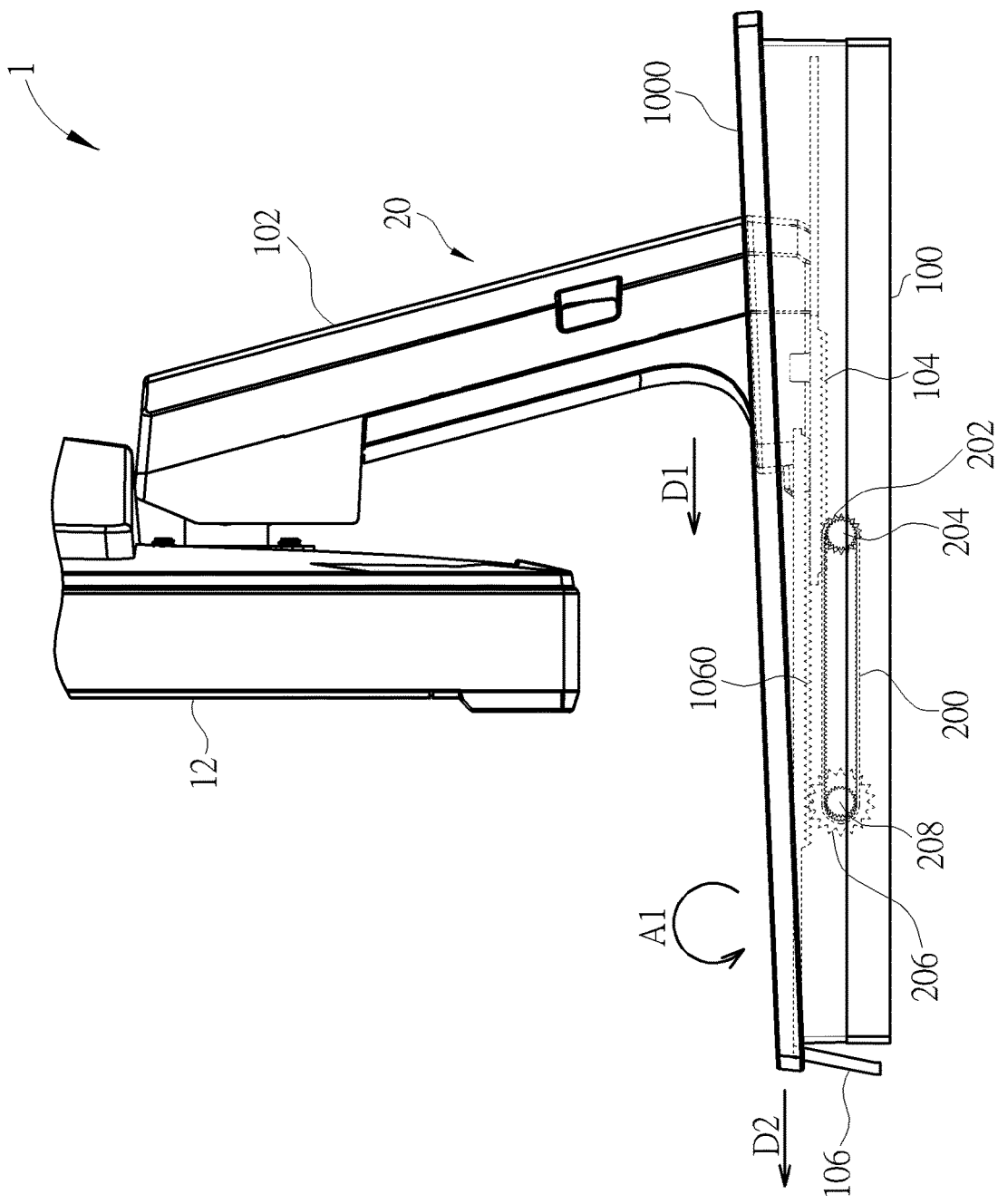
FIG. 8 is a side view illustrating the display device equipped with the support base shown in FIG. 7.
Figure 9:
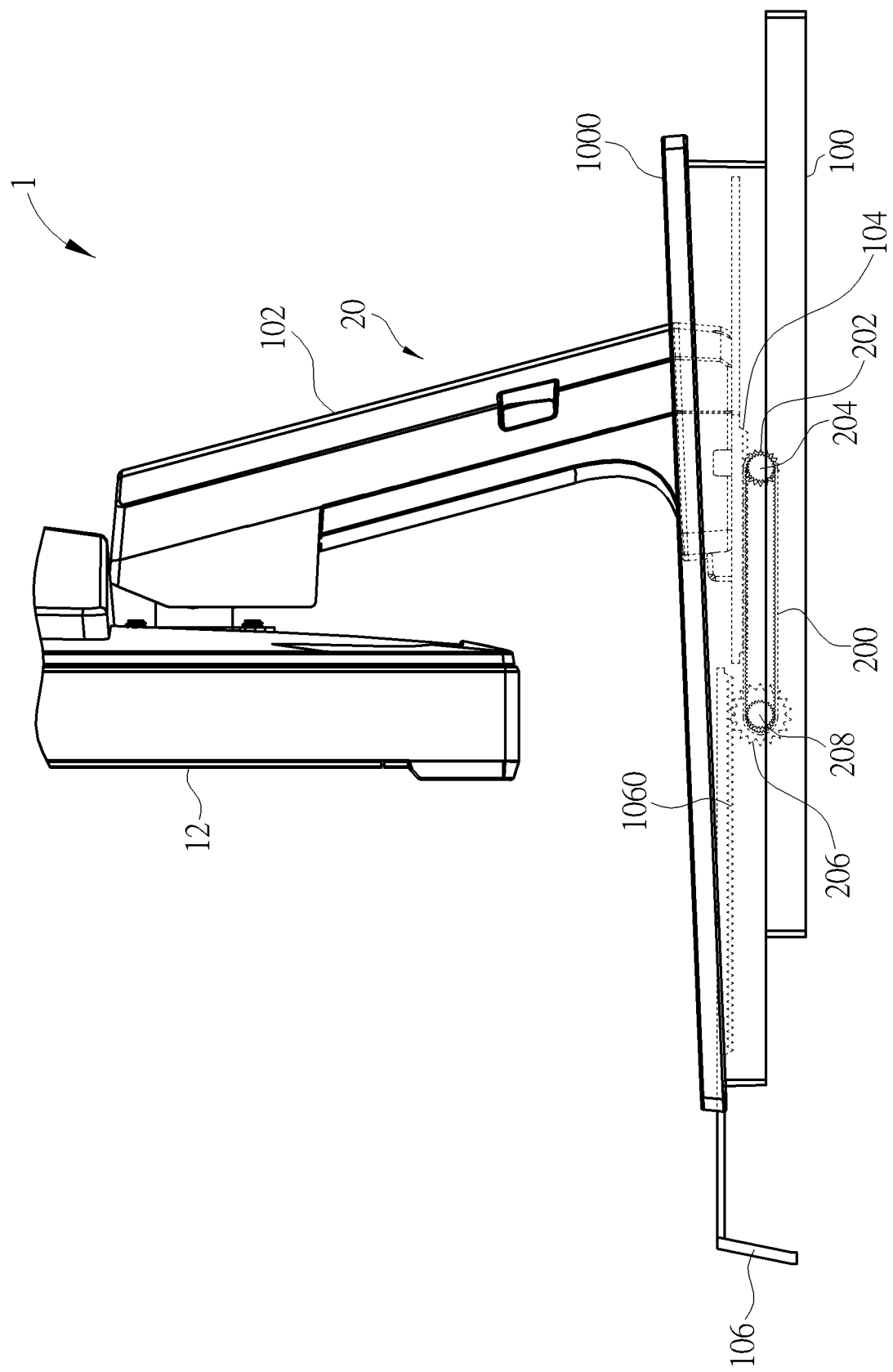
FIG. 9 is a side view illustrating the support frame shown in FIG. 8 after moving linearly with respect to the base casing.

Referring to FIGS. 7 to 9, FIG. 7 is a perspective view illustrating the inside of a support base 20 according to another embodiment of the invention, FIG. 8 is a side view illustrating the display device 1 equipped with the support base 20 shown in FIG. 7, and FIG. 9 is a side view illustrating the support frame 102 shown in FIG. 8 after moving linearly with respect to the base casing 100.

The main difference between the support base 20 and the aforesaid support base 10 is that the support base 20 further comprises a belt 200 disposed in the base casing 100, as shown in FIGS. 7 to 9. For further illustration, the support base 20 replaces the aforesaid third rack 114 by the belt 200. In this embodiment, the support base 20 may comprise two belts 200, two first gears 202, two second gears 204, two third gears 206 and two fourth gears 208, wherein the first gear 202 and the second gear 204 are coaxial, and the third gear 206 and the fourth gear 208 are coaxial. The first gear 202 meshes with the first rack 104, the second gear 204 meshes with the belt 200, the third gear 206 meshes with the second rack 1060, and the fourth gear 208 meshes with the belt 200.

It should be noted that the support base 20 of the invention may comprise one or more sets of first rack 104, second rack 1060, belt 200, first gear 202, second gear 204, third gear 206 and fourth gear 208 according to practical applications.

The aforesaid support base 10 of the display device 1 may be replaced by the support base 20. As shown in FIG. 8, when the support frame 102 moves linearly along the first direction D1, the first rack 104 drives the first gear 202 to rotate along the direction indicated by the arrow A1. Since the first gear 202 and the second gear 204 are coaxial, the second gear 204 rotates along with the first gear 202 along the direction indicated by the arrow A1. Then, the second gear 204 drives the fourth gear 208 to rotate along the direction indicated by the arrow A1 through the belt 200. Since the third gear 206 and the fourth gear 208 are coaxial, the third gear 206 rotates along with the fourth gear 208 along the direction indicated by the arrow A1. At this time, the third gear 206 drives the second rack 1060 to move along the second direction D2, so as to drive the auxiliary support member 106 to move along the second direction D2. In other words, when the support frame 102 moves linearly along the first direction D1, the first rack 104 drives the auxiliary support member 106 to move along the second direction D2 through the first gear 202, the second gear 204, the belt 200, the fourth gear 208, the third gear 206 and the second rack 1060, such that the auxiliary support member 106 extends forward from the base casing 100, as shown in FIG. 9. In this embodiment, an angle included between the first direction D1 and the second direction D2 may be essentially equal to 0 degrees, i.e. the first direction D1 and the second direction D2 may be identical and parallel to each other.

Accordingly, the display device 1 and the support base 20 thereof can keep stability of the center of gravity by the auxiliary support member 106 and will not topple over during movement. Needless to say, the support frame 102 may also move linearly with respect to the base casing 100 from the position shown in FIG. 9 to the position shown in FIG. 8. At this time, the auxiliary support member 106 retracts into the base casing 100 synchronously.

In this embodiment, a diameter of the second gear 204 may be equal to a diameter of the fourth gear 208, and a diameter of the third gear 206 may be smaller than a diameter of the first gear 202. Accordingly, when the support frame 102 drives the cover 1000 to move linearly along the first direction D1, the auxiliary support member 106 is capable of moving more distances than the support frame 102 and the cover 1000, such that there is a relative displacement between the auxiliary support member 106 and the cover 1000. Accordingly, the center of gravity of the display device 1 and the support base 20 thereof may be kept more stably during movement.

In another embodiment, the diameter of the third gear 206 may also be equal to the diameter of the first gear 202, such that there is no relative displacement between the auxiliary support member 106 and the cover 1000. In another embodiment, the diameter of the second gear 204 may also be equal to the diameter of the first gear 202. At this time, the second gear 204 and the first gear 202 may be integrated into an identical gear. In another embodiment, the diameter of the fourth gear 208 may also be equal to the diameter of the third gear 206. At this time, the fourth gear 208 and the third gear 206 may be integrated into an identical gear.

Figure 10:
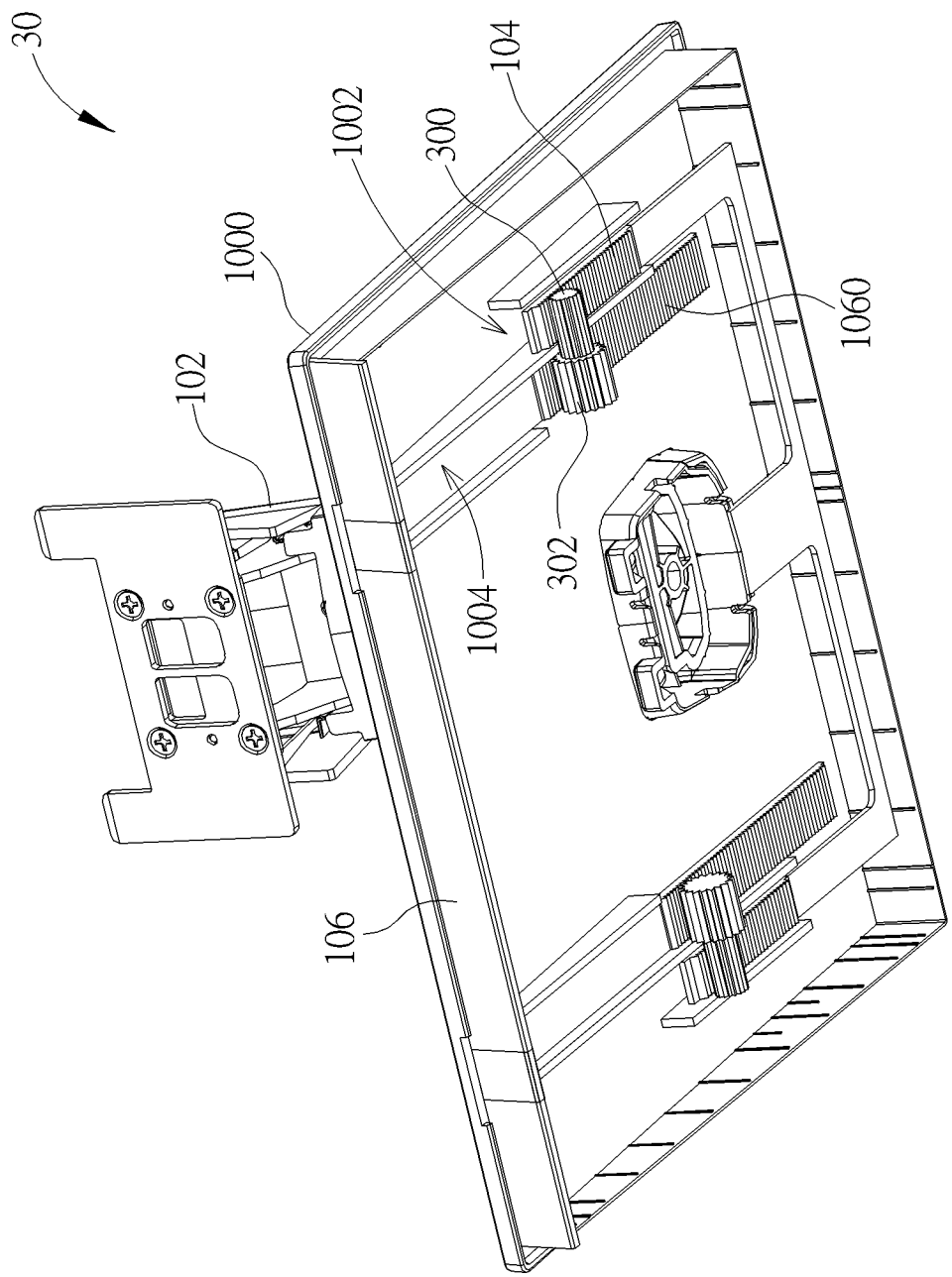
FIG. 10 is a perspective view illustrating the inside of a support base according to another embodiment of the invention.
Figure 11:
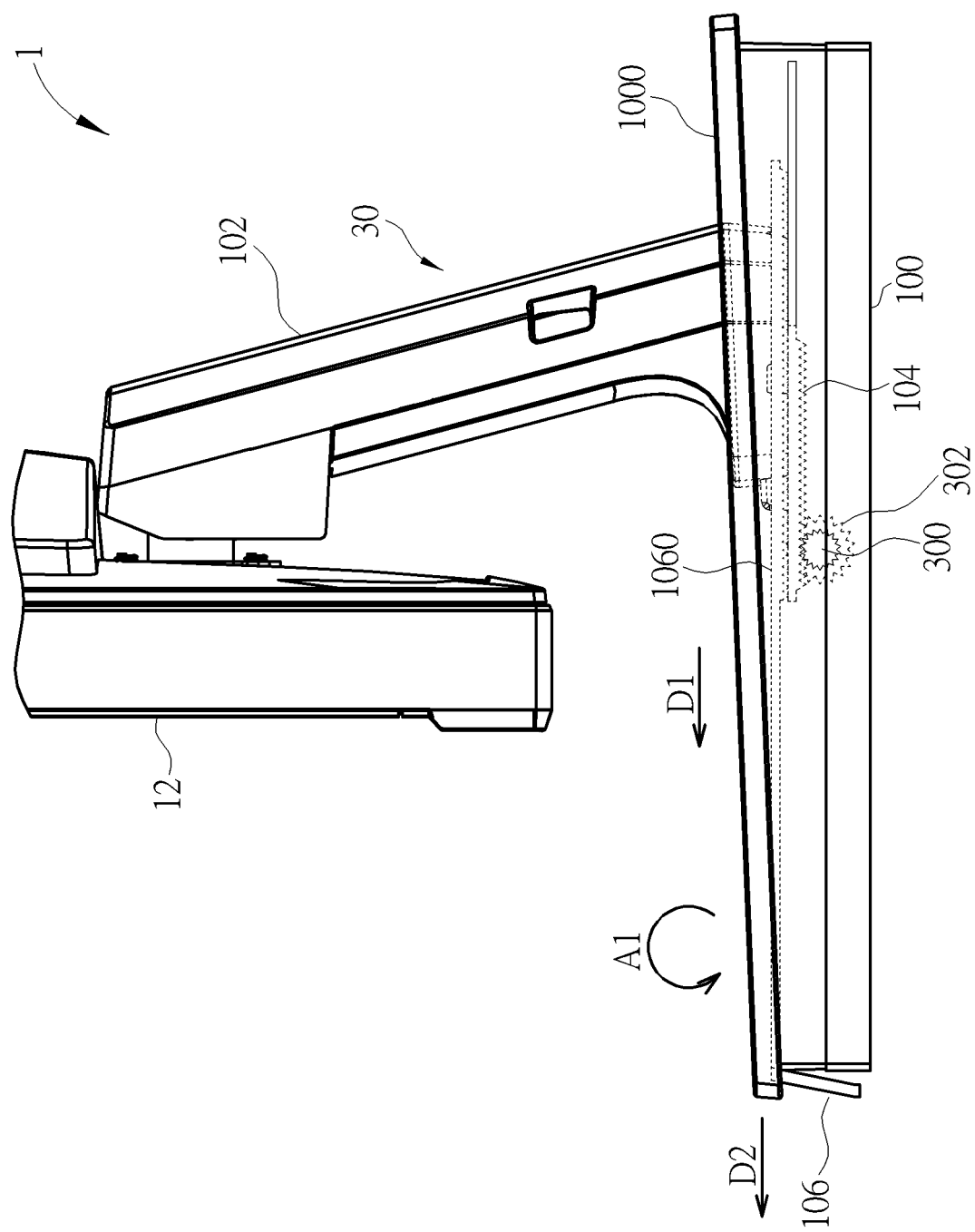
FIG. 11 is a side view illustrating the display device equipped with the support base shown in FIG. 10.
Figure 12:
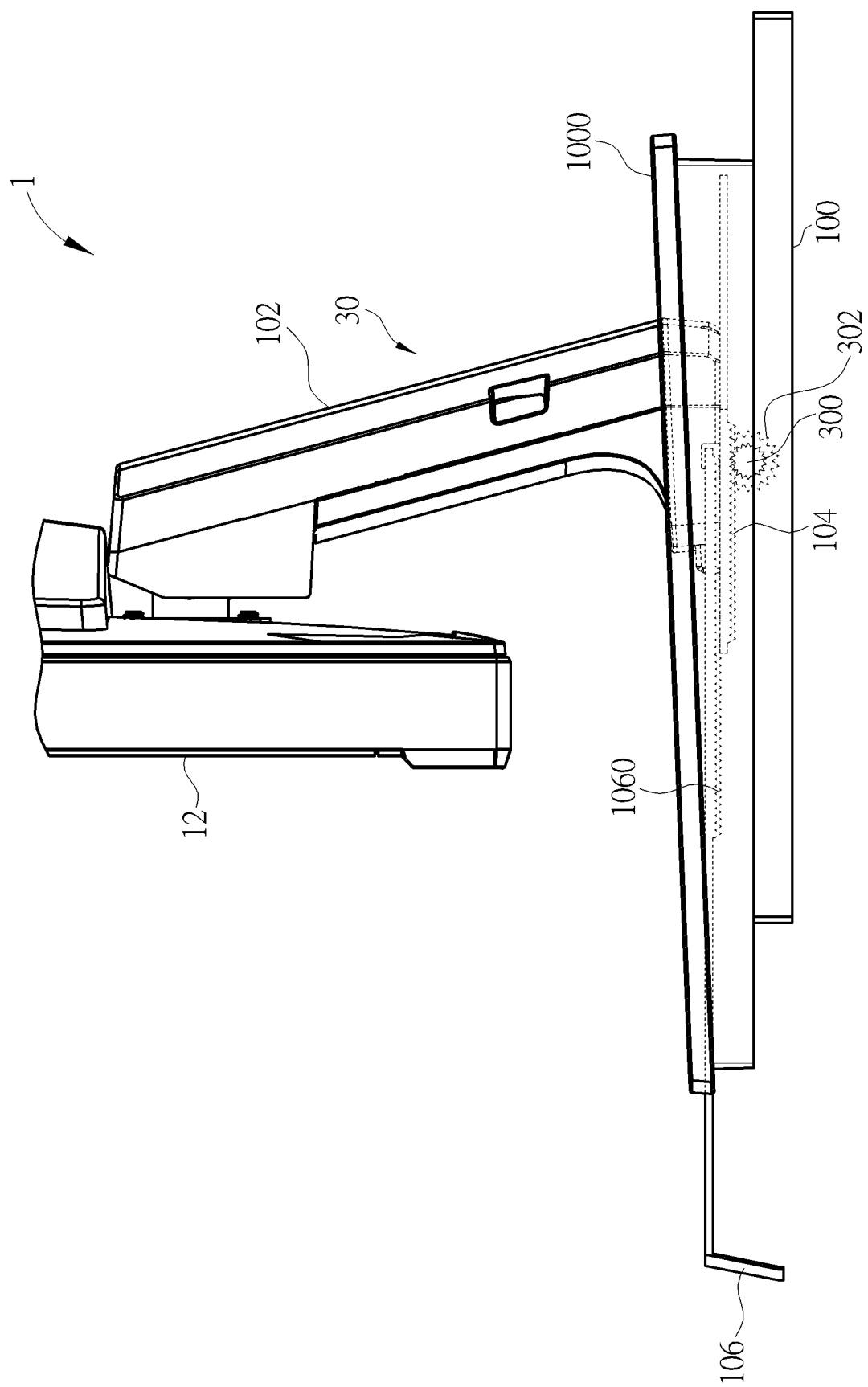
FIG. 12 is a side view illustrating the support frame shown in FIG. 11 after moving linearly with respect to the base casing.

Referring to FIGS. 10 to 12, FIG. 10 is a perspective view illustrating the inside of a support base 30 according to another embodiment of the invention, FIG. 11 is a side view illustrating the display device 1 equipped with the support base 30 shown in FIG. 10, and FIG. 12 is a side view illustrating the support frame 102 shown in FIG. 11 after moving linearly with respect to the base casing 100.

The main difference between the support base 30 and the aforesaid support base 10 is that the support base 30 omits the aforesaid third gear 112, as shown in FIGS. 10 to 12. In this embodiment, the support base 30 may comprise two first gears 300 and two second gears 302, wherein the first gear 300 and the second gear 302 are coaxial. The first gear 300 meshes with the first rack 104 and the second gear 302 meshes with the second rack 1060.

It should be noted that the support base 30 of the invention may comprise one or more sets of first rack 104, second rack 1060, first gear 300 and second gear 302 according to practical applications.

The aforesaid support base 10 of the display device 1 may be replaced by the support base 30. As shown in FIG. 11, when the support frame 102 moves linearly along the first direction D1, the first rack 104 drives the first gear 300 to rotate along the direction indicated by the arrow A1. Since the first gear 300 and the second gear 302 are coaxial, the second gear 302 rotates along with the first gear 300 along the direction indicated by the arrow A1. At this time, the second gear 302 drives the second rack 1060 to move along the second direction D2, so as to drive the auxiliary support member 106 to move along the second direction D2. In other words, when the support frame 102 moves linearly along the first direction D1, the first rack 104 drives the auxiliary support member 106 to move along the second direction D2 through the first gear 300, the second gear 302 and the second rack 1060, such that the auxiliary support member 106 extends forward from the base casing 100, as shown in FIG. 12. In this embodiment, an angle included between the first direction D1 and the second direction D2 may be essentially equal to 0 degrees, i.e. the first direction D1 and the second direction D2 may be identical and parallel to each other.

Accordingly, the display device 1 and the support base 30 thereof can keep stability of the center of gravity by the auxiliary support member 106 and will not topple over during movement. Needless to say, the support frame 102 may also move linearly with respect to the base casing 100 from the position shown in FIG. 12 to the position shown in FIG. 11. At this time, the auxiliary support member 106 retracts into the base casing 100 synchronously.

In this embodiment, a diameter of the second gear 302 may be smaller than a diameter of the first gear 300. Accordingly, when the support frame 102 drives the cover 1000 to move linearly along the first direction D1, the auxiliary support member 106 is capable of moving more distances than the support frame 102 and the cover 1000, such that there is a relative displacement between the auxiliary support member 106 and the cover 1000. Accordingly, the center of gravity of the display device 1 and the support base 30 thereof may be kept more stably during movement.

In another embodiment, the diameter of the second gear 302 may also be equal to the diameter of the first gear 300. At this time, the second gear 302 and the first gear 300 may be integrated into an identical gear.

Figure 13:
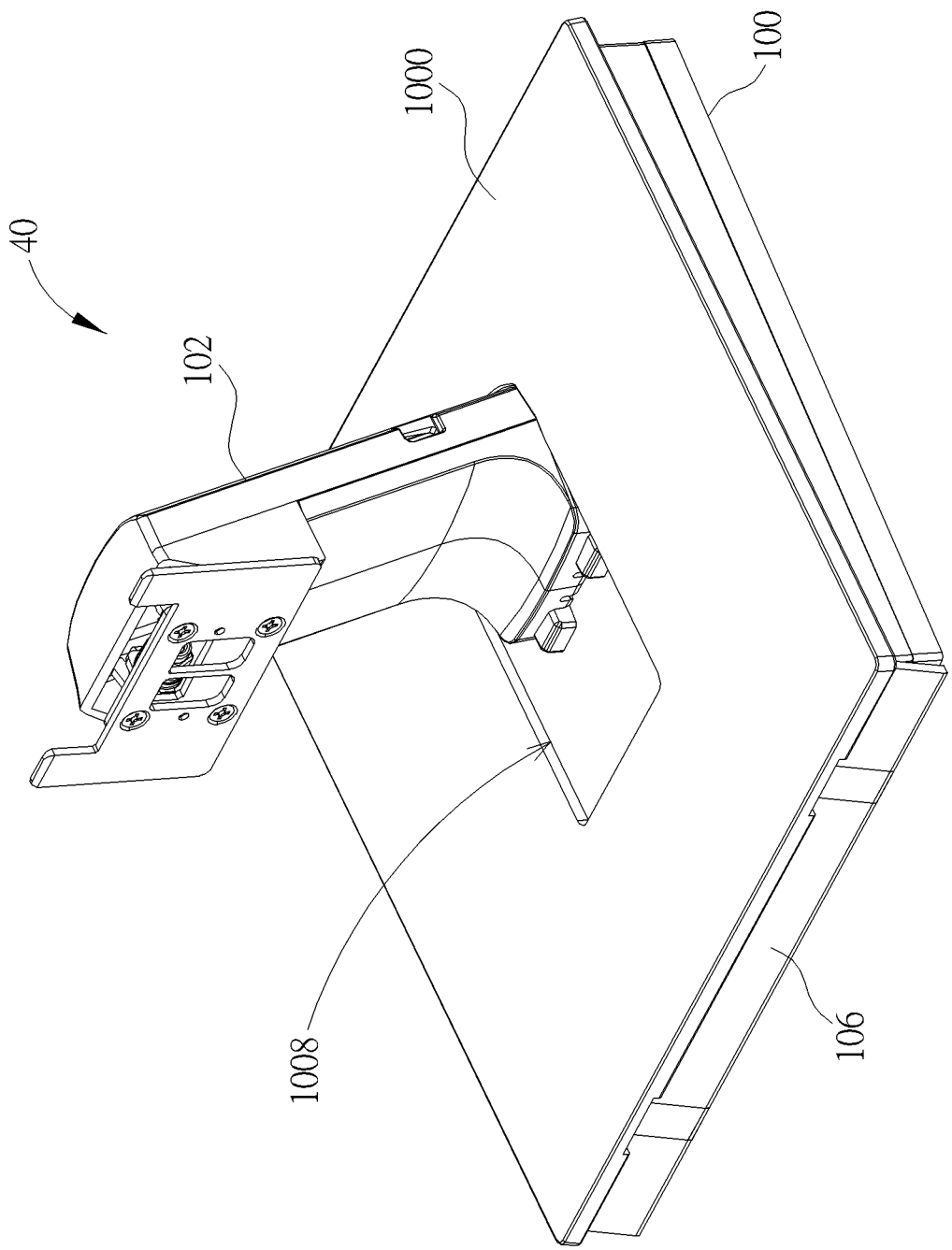
FIG. 13 is a perspective view illustrating a support base according to another embodiment of the invention.
Figure 14:
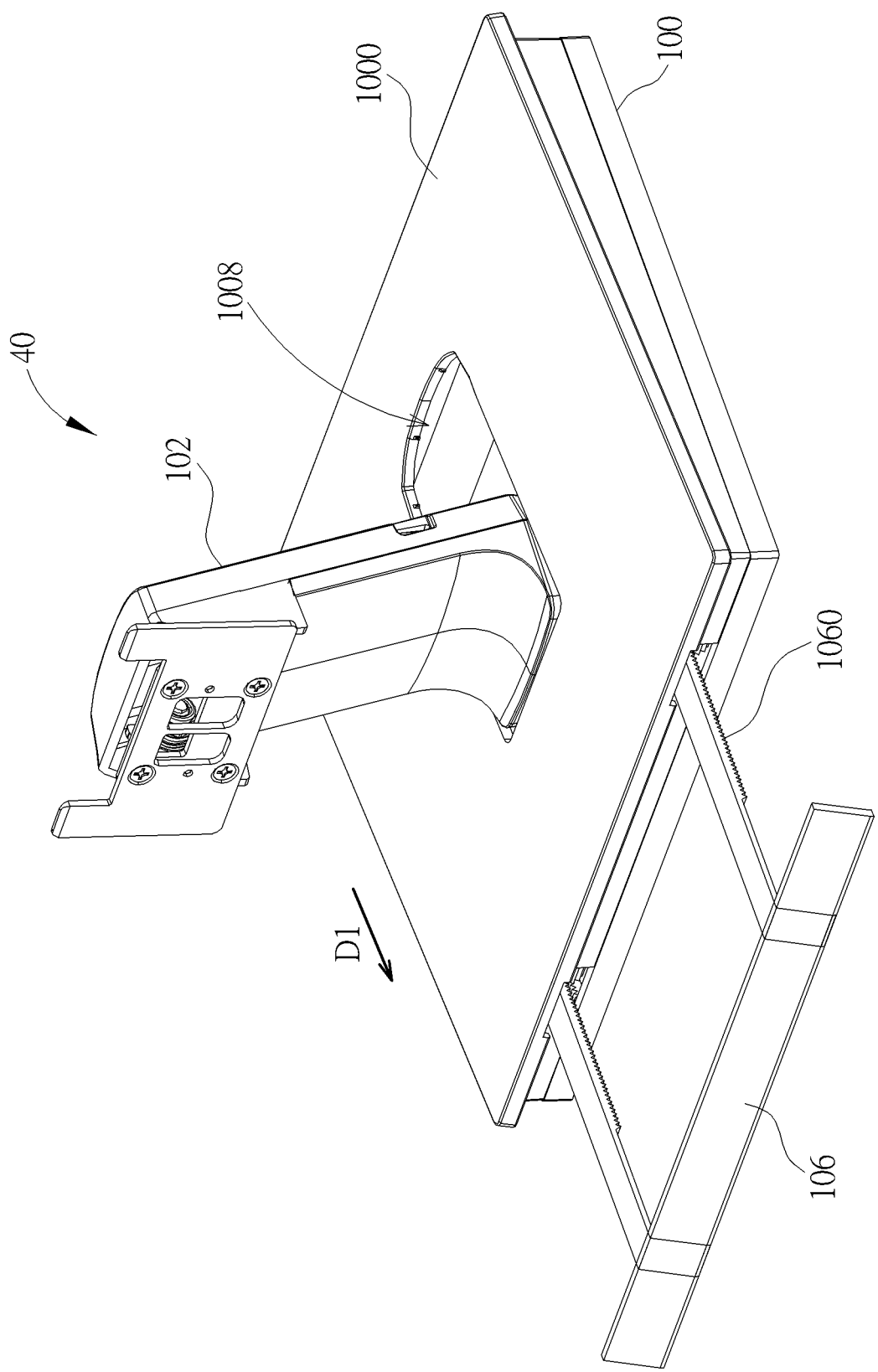
FIG. 14 is a perspective view illustrating the support frame shown in FIG. 13 after moving linearly with respect to the base casing.

Referring to FIGS. 13 and 14, FIG. 13 is a perspective view illustrating a support base 40 according to another embodiment of the invention and FIG. 14 is a perspective view illustrating the support frame 102 shown in FIG. 13 after moving linearly with respect to the base casing 100.

The main difference between the support base 40 and the aforesaid support base 10 is that the cover 1000 of the support base 40 has a hollow structure 1008, as shown in FIGS. 13 and 14. The support frame 102 is accommodated in the hollow structure 1008, such that the support frame 102 can move linearly within the hollow structure 1008 along the first direction D1. In other words, the cover 1000 is not connected to the support frame 102. Accordingly, when the support frame 102 moves linearly along the first direction D1, the support frame 102 does not drive the cover 1000 to move linearly along the first direction D1, as shown in FIG. 14.

Figure 15:
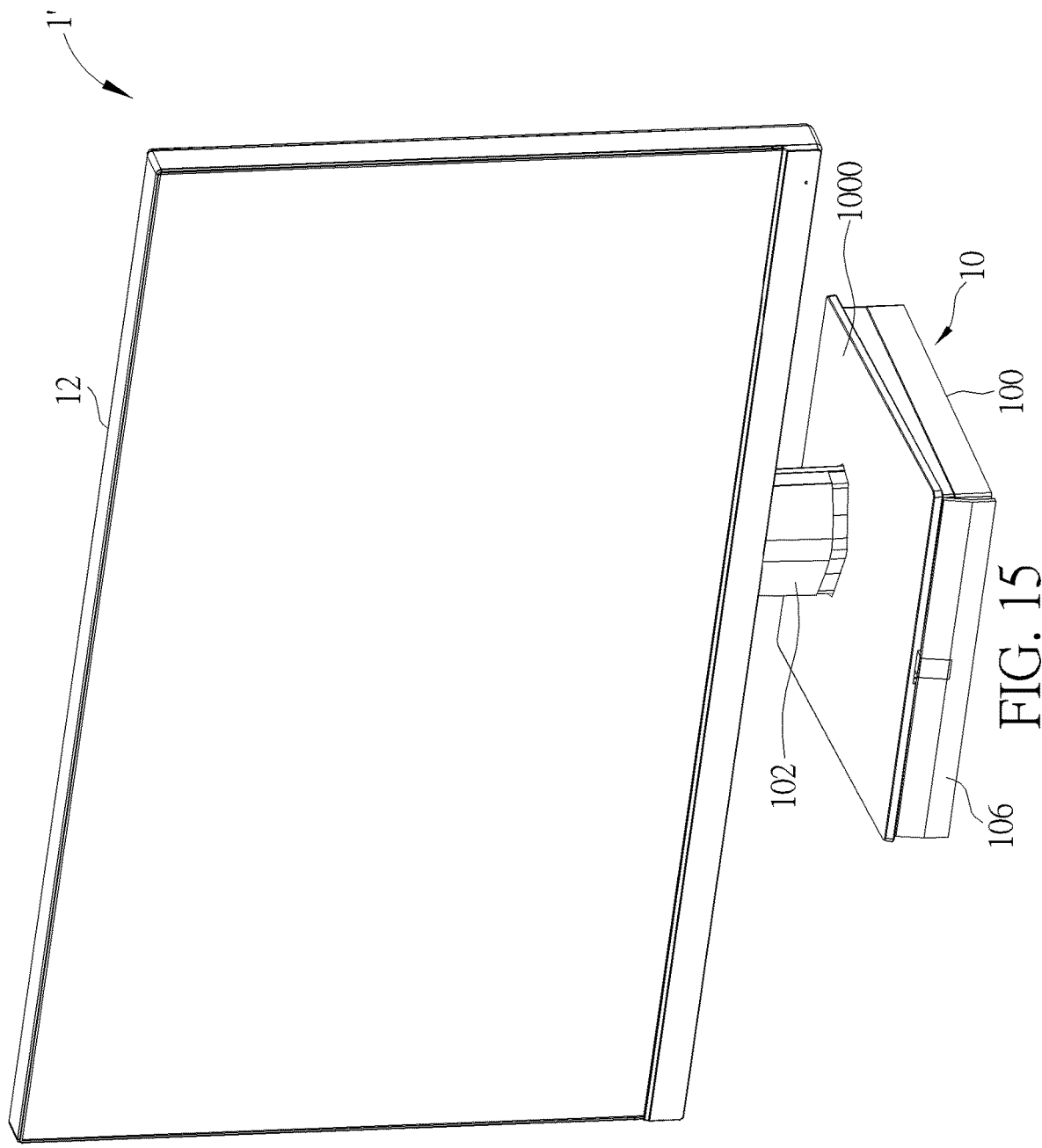
FIG. 15 is a perspective view illustrating a display device according to another embodiment of the invention.
Figure 16:
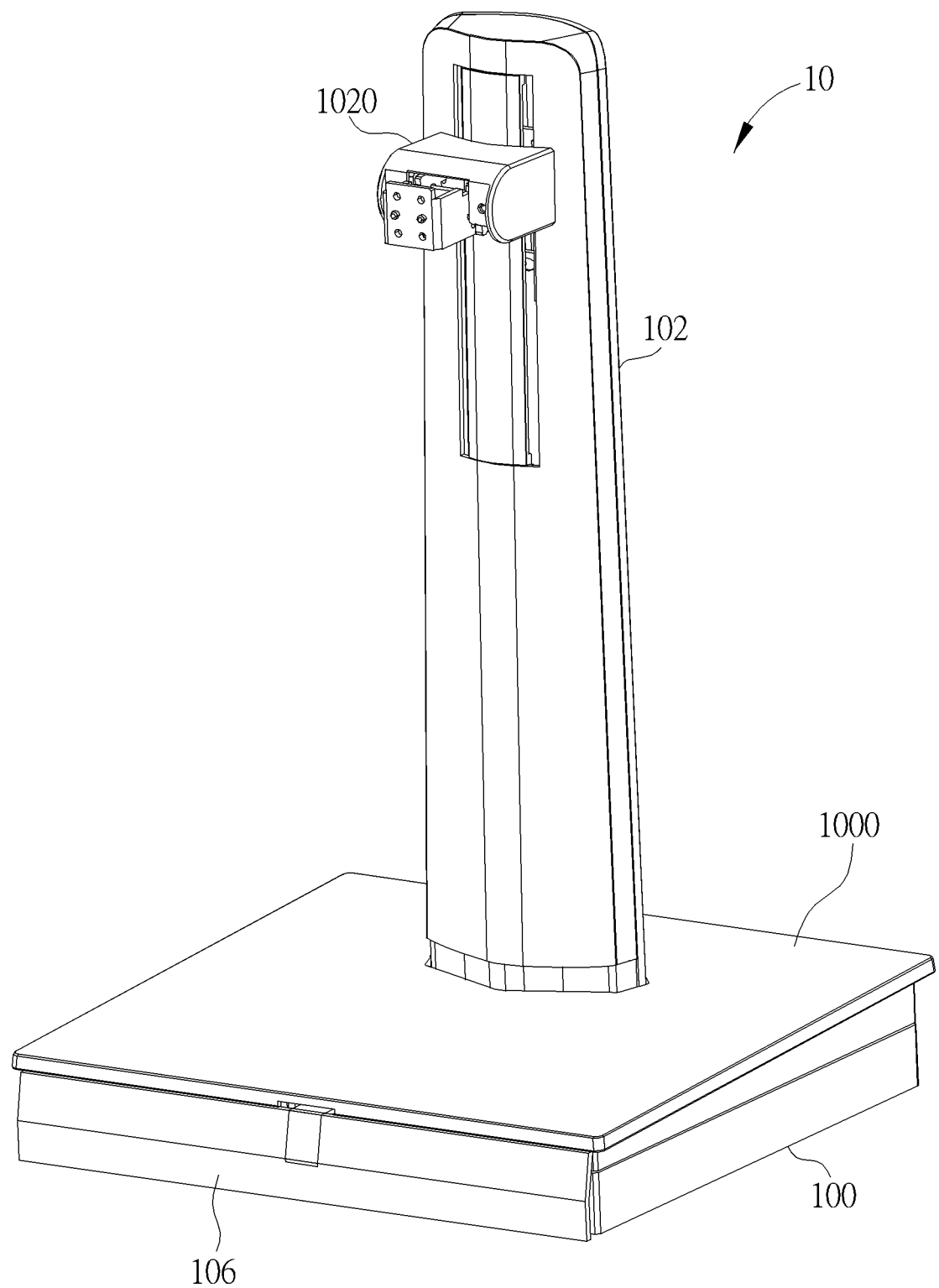
FIG. 16 is a perspective view illustrating the support base shown in FIG. 15.
Figure 17:
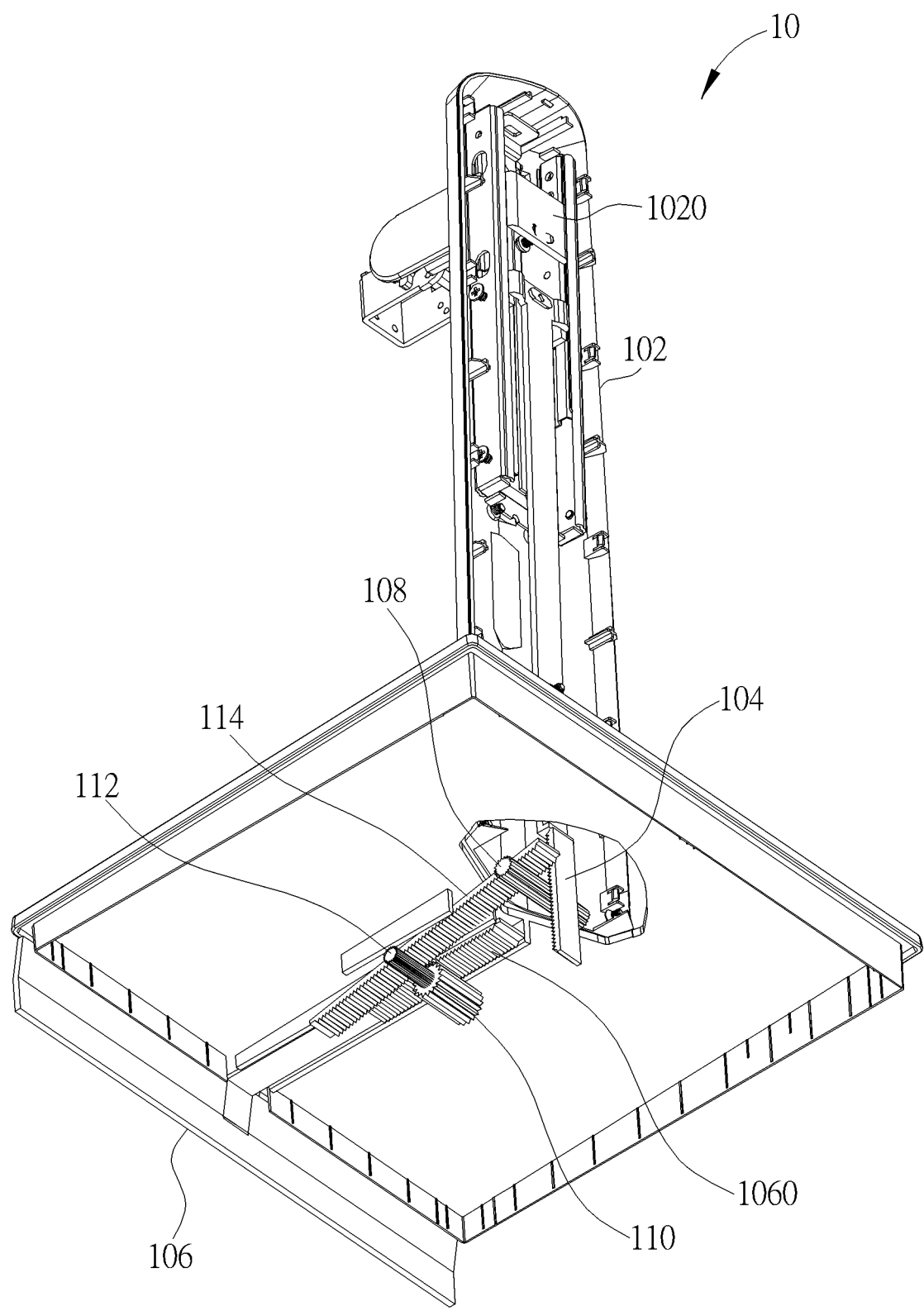
FIG. 17 is a perspective view illustrating the inside of the support base shown in FIG. 16 from another viewing angle.
Figure 18:
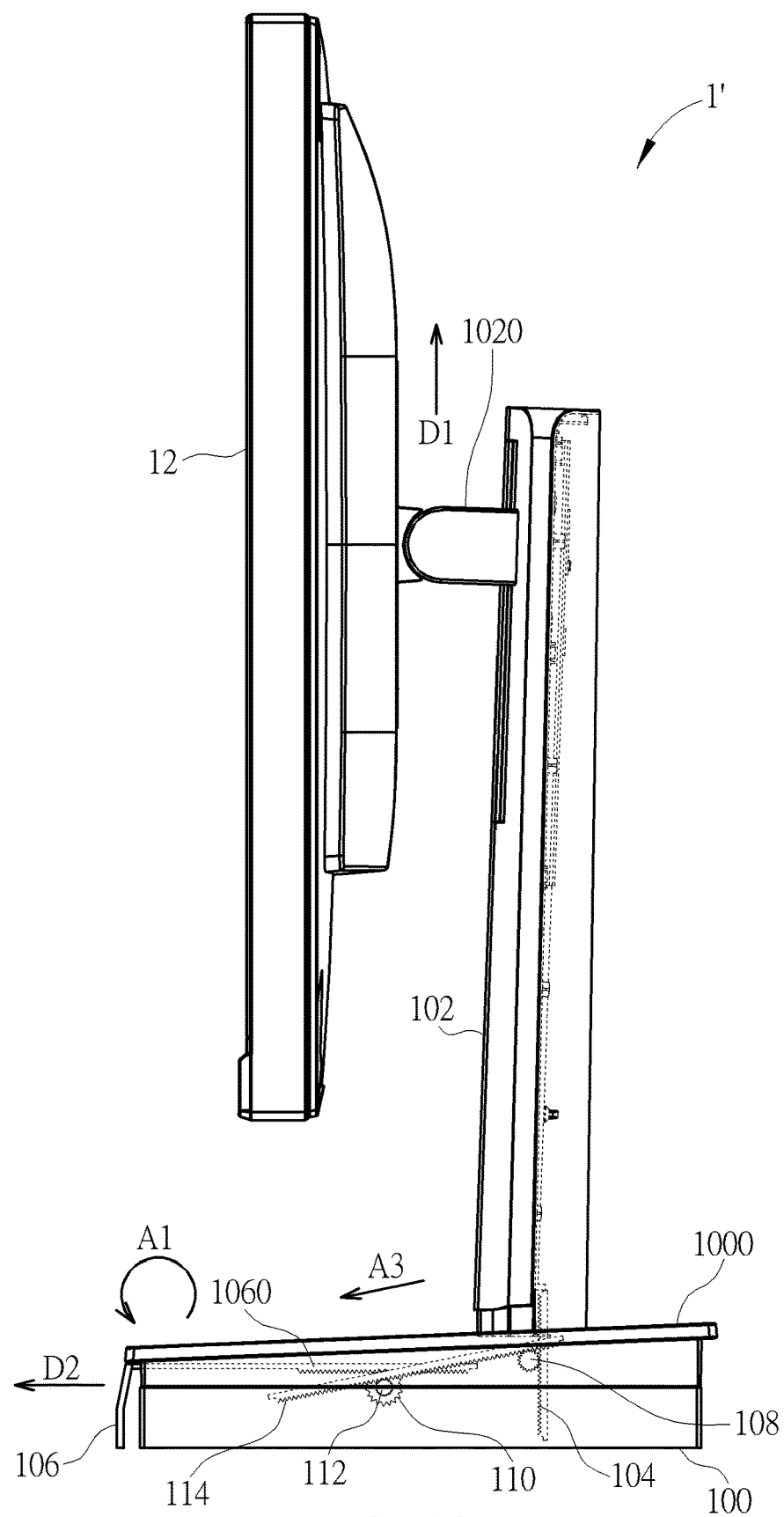
FIG. 18 is a side view illustrating the display device shown in FIG. 15.
Figure 19:
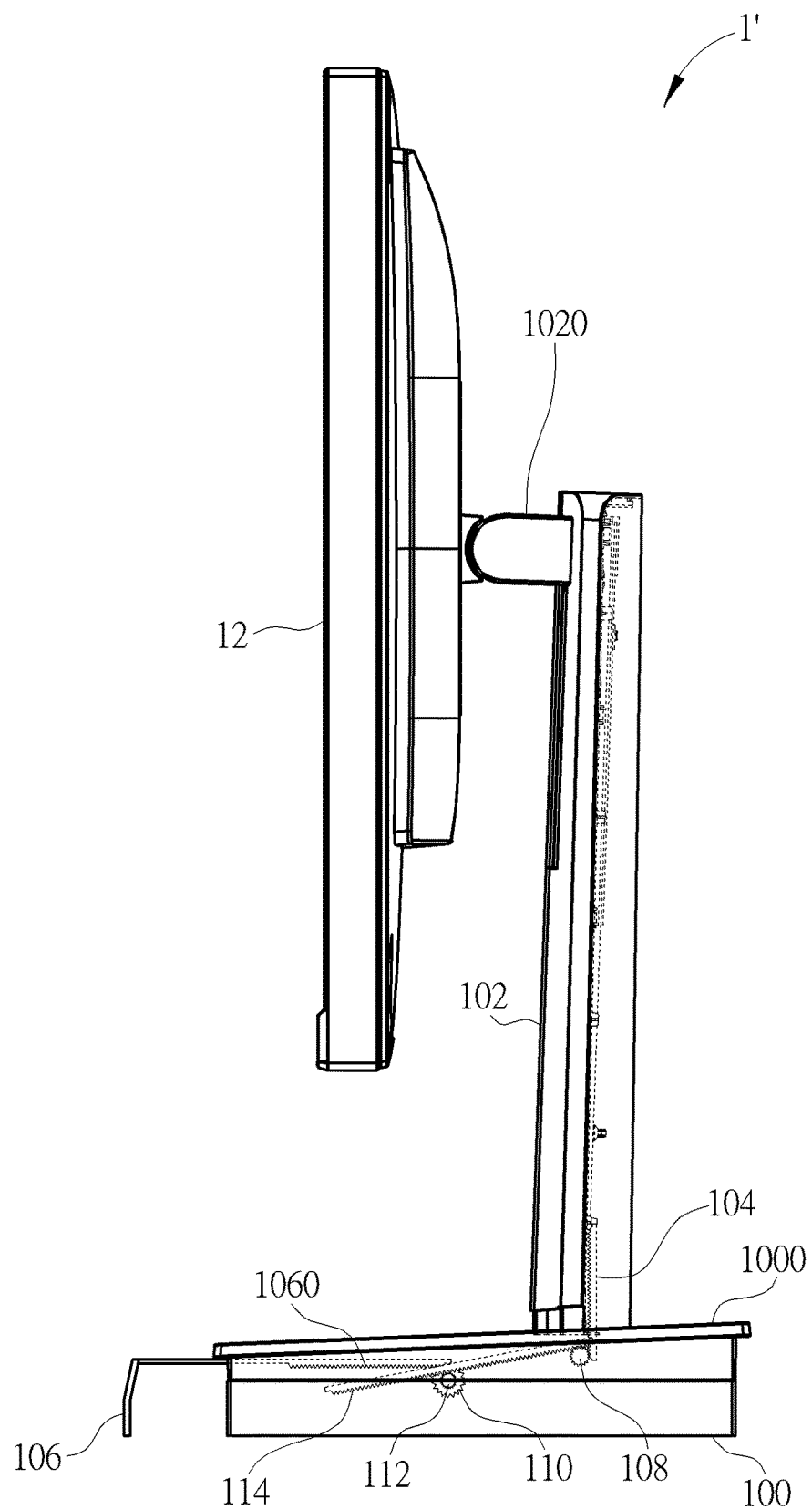
FIG. 19 is a side view illustrating the support frame shown in FIG. 18 after moving linearly with respect to the base casing.

Referring to FIGS. 15 to 19, FIG. 15 is a perspective view illustrating a display device 1' according to another embodiment of the invention, FIG. 16 is a perspective view illustrating the support base 10 shown in FIG. 15, FIG. 17 is a perspective view illustrating the inside of the support base 10 shown in FIG. 16 from another viewing angle, FIG. 18 is a side view illustrating the display device 1' shown in FIG. 15, and FIG. 19 is a side view illustrating the support frame 102 shown in FIG. 18 after moving linearly with respect to the base casing 100.

The main difference between the display device 1' and the aforesaid display device 1 is that the support frame 102 of the display device 1' comprises a sliding member 1020 and the first rack 104 is connected to the sliding member 1020. Furthermore, the connections between the first rack 104, the first gear 108, the third rack 114, the third gear 112, the second gear 110 and the second rack 1060 of the display device 1' are identical to those of the aforesaid display device 1, so the repeated explanation will not be depicted herein again.

In this embodiment, the sliding member 1020 of the support frame 102 may move linearly along the first direction D1 from a position shown in FIG. 18 to another position shown in FIG. 19. As shown in FIG. 18, when the sliding member 1020 of the support frame 102 moves linearly along the first direction D1, the first rack 104 drives the first gear 108 to rotate along the direction indicated by the arrow A1. Then, the first gear 108 drives the third rack 114 to move along a direction indicated by an arrow A3. Then, the third rack 114 drives the third gear 112 to rotate along the direction indicated by the arrow A1. Since the second gear 110 and the third gear 112 are coaxial, the second gear 110 rotates along with the third gear 112 along the direction indicated by the arrow A1. At this time, the second gear 110 drives the second rack 1060 to move along the second direction D2, so as to drive the auxiliary support member 106 to move along the second direction D2. In other words, when the support frame 102 moves linearly along the first direction D1, the first rack 104 drives the auxiliary support member 106 to move along the second direction D2 through the first gear 108, the third rack 114, the third gear 112, the second gear 110 and the second rack 1060, such that the auxiliary support member 106 extends forward from the base casing 100, as shown in FIG. 19. In this embodiment, an angle included between the first direction D1 and the second direction D2 may be essentially equal to 90 degrees, i.e. the first direction D1 and the second direction D2 may be perpendicular to each other.

Accordingly, the display device 1' and the support base 10 thereof can keep stability of the center of gravity by the auxiliary support member 106 and will not topple over during movement. Needless to say, the support frame 102 may also move linearly with respect to the base casing 100 from the position shown in FIG. 19 to the position shown in FIG. 18. At this time, the auxiliary support member 106 retracts into the base casing 100 synchronously.

It should be noted that in addition to 0 degrees and 90 degrees mentioned in the aforesaid embodiments, the angle included between the first direction D1 and the second direction D2 may also be essentially between 0 degrees and 90 degrees, so as to satisfy different adjusting requirements for the display unit 12.

In another embodiment, the third rack 114 shown in FIGS. 17 to 19 may also be replaced by the belt 200 shown in FIGS. 7 to 9 and the principle is essentially the same, so the repeated explanation will not be depicted herein again.

In another embodiment, the third rack 114 shown in FIGS. 17 to 19 may also be omitted according to the embodiment shown in FIGS. 10 to 12 and the principle is essentially the same, so the repeated explanation will not be depicted herein again.

As mentioned in the above, when the support frame moves linearly with respect to the base casing, the invention uses the first rack, the at least one gear and the second rack to cooperate with each other to drive the auxiliary support member to move synchronously. For example, when the support frame moves linearly forward or upward with respect to the base casing, the auxiliary support member will extend forward from the base casing. Furthermore, when the support frame moves linearly back to the original position with respect to the base casing, the auxiliary support member will retract into the base casing synchronously. Accordingly, the display device and the support frame thereof can keep stability of the center of gravity by the auxiliary support member and will not topple over during movement.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A support base comprising:
   a base casing;
   a support frame movably disposed on the base casing;
   a first rack disposed in the base casing and connected to the support frame;
   an auxiliary support member movably disposed in the base casing, the auxiliary support member having a second rack; and
   at least one gear meshing with the first rack and the second rack;
   wherein when the support frame moves linearly along a first direction, the first rack drives the auxiliary support member to move along a second direction through the at least one gear and the second rack, an angle included between the first direction and the second direction is essentially between 0 degrees and 90 degrees.

2. The support base of claim 1, wherein the angle included between the first direction and the second direction is essentially equal to 0 degrees and 90 degrees.

3. The support base of claim 1, further comprising a third rack movably disposed in the base casing, the at least one gear comprising a first gear, a second gear and a third gear, the first gear meshing with the first rack and the third rack, the second gear and the third gear being coaxial, the second gear meshing with the second rack, and the third gear meshing with the third rack.

4. The support base of claim 3, wherein a diameter of the first gear is equal to a diameter of the third gear, and a diameter of the second gear is smaller than or equal to a diameter of the third gear.

5. The support base of claim 1, further comprising a belt disposed in the base casing, the at least one gear comprising a first gear, a second gear, a third gear and a fourth gear, the first gear and the second gear being coaxial, the first gear meshing with the first rack, the second gear meshing with the belt, the third gear and the fourth gear being coaxial, the third gear meshing with the second rack, and the fourth gear meshing with the belt.

6. The support base of claim 5, wherein a diameter of the second gear is equal to a diameter of the fourth gear, and a diameter of the third gear is smaller than or equal to a diameter of the first gear.

7. The support base of claim 1, wherein the at least one gear comprises a first gear and a second gear, the first gear and the second gear are coaxial, the first gear meshes with the first rack, and the second gear meshes with the second rack.

8. The support base of claim 7, wherein a diameter of the second gear is smaller than or equal to a diameter of the first gear.

9. The support base of claim 1, wherein the base casing comprises a cover connected to the support frame; when the support frame moves linearly along the first direction, the support frame drives the cover to move linearly along the first direction.

10. The support base of claim 1, wherein the base casing comprises a cover, the cover has a hollow structure, the support frame is accommodated in the hollow structure, and the support frame moves linearly within the hollow structure along the first direction.

11. A display device comprising:
   a support base comprising:
      a base casing;
      a support frame movably disposed on the base casing;
      a first rack disposed in the base casing and connected to the support frame;
      an auxiliary support member movably disposed in the base casing, the auxiliary support member having a second rack; and
      at least one gear meshing with the first rack and the second rack; and
   a display unit disposed on the support frame;
   wherein when the support frame moves linearly along a first direction, the first rack drives the auxiliary support member to move along a second direction through the at least one gear and the second rack, an angle included between the first direction and the second direction is essentially between 0 degrees and 90 degrees.

12. The display device of claim 11, wherein the angle included between the first direction and the second direction is essentially equal to 0 degrees and 90 degrees.

13. The display device of claim 11, wherein the support base further comprises a third rack movably disposed in the base casing, the at least one gear comprises a first gear, a second gear and a third gear, the first gear meshes with the first rack and the third rack, the second gear and the third gear are coaxial, the second gear meshes with the second rack, and the third gear meshes with the third rack.

14. The display device of claim 13, wherein a diameter of the first gear is equal to a diameter of the third gear, and a diameter of the second gear is smaller than or equal to a diameter of the third gear.

15. The display device of claim 11, wherein the support base further comprises a belt disposed in the base casing, the at least one gear comprises a first gear, a second gear, a third gear and a fourth gear, the first gear and the second gear are coaxial, the first gear meshes with the first rack, the second gear meshes with the belt, the third gear and the fourth gear are coaxial, the third gear meshes with the second rack, and the fourth gear meshes with the belt.

16. The display device of claim 15, wherein a diameter of the second gear is equal to a diameter of the fourth gear, and a diameter of the third gear is smaller than or equal to a diameter of the first gear.

17. The display device of claim 11, wherein the at least one gear comprises a first gear and a second gear, the first gear and the second gear are coaxial, the first gear meshes with the first rack, and the second gear meshes with the second rack.

18. The display device of claim 17, wherein a diameter of the second gear is smaller than or equal to a diameter of the first gear.

19. The display device of claim 11, wherein the base casing comprises a cover connected to the support frame; when the support frame moves linearly along the first direction, the support frame drives the cover to move linearly along the first direction.

20. The display device of claim 11, wherein the base casing comprises a cover, the cover has a hollow structure, the support frame is accommodated in the hollow structure, and the support frame moves linearly within the hollow structure along the first direction.

* * * * *